US010819614B2

(12) United States Patent
Fujishima et al.

(10) Patent No.: US 10,819,614 B2
(45) Date of Patent: Oct. 27, 2020

(54) NETWORK MONITORING APPARATUS AND NETWORK MONITORING METHOD

(71) Applicant: FUJITSU LIMITED, Kawasaki-shi, Kanagawa (JP)

(72) Inventors: Yuki Fujishima, Yokohama (JP); Masanobu Morinaga, Yokohama (JP); Kazuyoshi Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 16/180,907

(22) Filed: Nov. 5, 2018

(65) Prior Publication Data
US 2019/0149448 A1 May 16, 2019

(30) Foreign Application Priority Data

Nov. 16, 2017 (JP) .................. 2017-220985

(51) Int. Cl.
H04L 12/26 (2006.01)
H04L 29/06 (2006.01)
H04L 29/08 (2006.01)

(52) U.S. Cl.
CPC .......... H04L 43/50 (2013.01); H04L 63/0428 (2013.01); H04L 67/125 (2013.01); H04L 67/34 (2013.01); H04L 69/22 (2013.01)

(58) Field of Classification Search
CPC . H04L 63/145; H04L 63/1441; G06F 21/566; G06F 21/56; G06F 21/577
See application file for complete search history.

(56) References Cited

U.S. PATENT DOCUMENTS

| 9,985,980 | B1* | 5/2018 | Kolman | .................. G06F 21/56 |
| 2006/0179391 | A1 | 8/2006 | Rodriguez et al. | |
| 2009/0282485 | A1* | 11/2009 | Bennett | .................. G06F 21/51 |
| | | | | 726/24 |
| 2012/0042375 | A1* | 2/2012 | Yoo | .......................... G06F 21/55 |
| | | | | 726/13 |
| 2012/0167223 | A1* | 6/2012 | Di Crescenzo | ....... G06F 21/565 |
| | | | | 726/24 |
| 2014/0013434 | A1* | 1/2014 | Ranum | .................. H04L 63/145 |
| | | | | 726/24 |

FOREIGN PATENT DOCUMENTS

| JP | 2000-112847 | 4/2000 |
| JP | 2005-216291 | 8/2005 |
| JP | 2006-195984 | 7/2006 |
| JP | 2010-015513 | 1/2010 |

* cited by examiner

Primary Examiner — Hitesh Patel
(74) Attorney, Agent, or Firm — Fujitsu Patent Center

(57) ABSTRACT

There is provided a network monitoring apparatus including a memory in which information of a remote operation and a combination of one or more command codes are associated with each other, and a processor coupled to the memory and the processor configured to acquire a command code of the one or more commands codes from a header of an encrypted execution request packet for executing the one or more commands for implementing a remote operation, determine whether or not there exists the combination included in a command code list in which acquired command codes are sequentially indicated, by referring the memory, and determine that the remote operation associated with the combination is successful when it is determined that there exists the combination included in the command code list.

9 Claims, 10 Drawing Sheets

| REMOTE OPERATION NAME | COMBINATION OF INTERNAL COMMANDS |
|---|---|
| REMOTE OPERATION 1 | COMMAND CODE 1, COMMAND CODE2 |
| REMOTE OPERATION 2 | COMMAND CODE 6, COMMAND CODE 8, COMMAND CODE 10 |
| REMOTE OPERATION 3 | COMMAND CODE 11, COMMAND CODE 12 |
| . . . | . . . |

| TIME | TRANSFER SOURCE IP ADDRESS | TRANSFER SOURCE PORT NUMBER | RECEPTION DESTINATION IP ADDRESS | RECEPTION DESTINATION PORT NUMBER | ENCRYPTION SCHEME | COMMAND CODE LIST | | | |
|---|---|---|---|---|---|---|---|---|---|
| T1 | x.x.x.1 | P1 | x.x.x.2 | P2 | ... | COMMAND CODE 1 | COMMAND CODE 2 | COMMAND CODE 3 | ... |

COMMAND CODE IS ADDED TO COMMAND CODE LIST

| TIME | TRANSFER SOURCE IP ADDRESS | TRANSFER SOURCE PORT NUMBER | RECEPTION DESTINATION IP ADDRESS | RECEPTION DESTINATION PORT NUMBER | REMOTE OPERATION NAME | REMOTE OPERATION RESULT | ... |
|---|---|---|---|---|---|---|---|
| T1 | x.x.x.1 | P1 | x.x.x.2 | P2 | REMOTE OPERATION 1 | SUCCESSFUL | ... |

FIG. 11B

| TIME | TRANSFER SOURCE IP ADDRESS | TRANSFER SOURCE PORT NUMBER | RECEPTION DESTINATION IP ADDRESS | RECEPTION DESTINATION PORT NUMBER | REMOTE OPERATION NAME | REMOTE OPERATION RESULT | COMMAND CODE LIST | ... |
|---|---|---|---|---|---|---|---|---|
| T1 | x.x.x.1 | P1 | x.x.x.2 | P2 | ... | FAILED | ... | ... |

NETWORK MONITORING APPARATUS AND NETWORK MONITORING METHOD

CROSS-REFERENCE TO RELATED APPLICATION

This application is based upon and claims the benefit of priority of the prior Japanese Patent Application No. 2017-220985, filed on Nov. 16, 2017, the entire contents of which are incorporated herein by reference.

FIELD

The embodiments discussed herein are related to a network monitoring apparatus and a network monitoring method.

BACKGROUND

As a form of cyber-attack, a computer infected with malware may remotely operate a target computer. For example, the computer infected with malware performs a remote operation on the target computer by using an illegally stolen regular account. When such a cyber-attack occurs, it is required to specify a success or failure of the remote operation in order to determine the contents or priorities of countermeasures against the cyber-attack.

In this regard, there has been known a technique of specifying the success or failure of the remote operation by acquiring a status value stored at a specific position of a head packet or a last packet among plural response packets with respect to a request packet of the remote operation.

Related techniques are disclosed in, for example, Japanese Laid-open Patent Publication Nos. 2005-216291, 2000-112847, 2006-195984, and 2010-015513.

SUMMARY

According to an aspect of the embodiments, a network monitoring apparatus includes a memory in which information of a remote operation and a combination of one or more command codes are associated with each other, and a processor coupled to the memory and the processor configured to acquire a command code of the one or more commands codes from a header of an encrypted execution request packet for executing the one or more commands for implementing a remote operation, determine whether or not there exists the combination included in a command code list in which acquired command codes are sequentially indicated, by referring the memory, and determine that the remote operation associated with the combination is successful when it is determined that there exists the combination included in the command code list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a view illustrating an example of remote operation determination information to which a command code is added; and FIGS. 11A and 11B are views illustrating an example of remote operation result information.

DESCRIPTION OF EMBODIMENTS

When a specific computer remotely operates another computer, a negotiation is conducted between the operation source computer and the operation target computer to set, for example, a communication scheme or a presence or absence of an encryption of a communication. When the encryption of the communication is set by the negotiation, the data portion of a request packet or a response packet is encrypted in the communication conducted after the negotiation.

Therefore, in this case, the success or failure of the remote operation may not be specified from a status value stored at a specific position of the response packet.

Hereinafter, an embodiment of a technique for determining the success or failure of an encrypted remote operation will be described with reference to the accompanying drawings.

[Overall Configuration]

Figure 1:
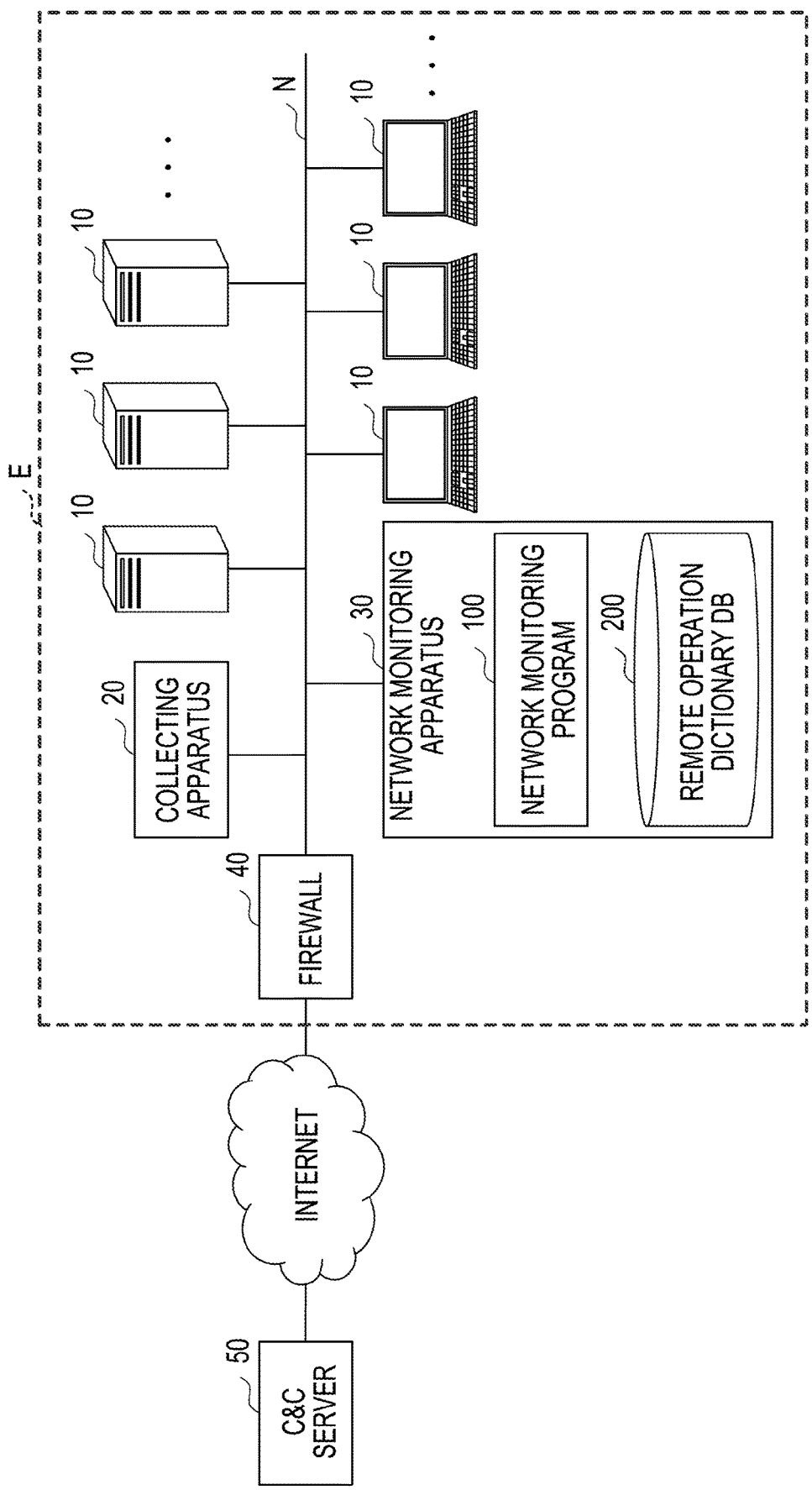
FIG. 1 is a view illustrating an example of an overall configuration of a system including a network monitoring apparatus according to an embodiment.

First, the overall configuration of a system including a network monitoring apparatus 30 according to an embodiment will be described with reference to FIG. 1. FIG. 1 is a view illustrating an example of the overall configuration of the system including the network monitoring apparatus 30 according to an embodiment.

As illustrated in FIG. 1, a system environment E which is, for example, an intranet of an organization such as a company or a group, includes plural information processing apparatuses 10, a collecting apparatus 20, a network monitoring apparatus 30, and a firewall 40. The plural information processing apparatuses 10, the collecting apparatus 20, the network monitoring apparatus 30, and the firewall 40 are interconnected to be able to communicate with each other via a network N such as the LAN (Local Area Network).

The network N in the system environment E is connected to the Internet via the firewall 40.

The plural information processing apparatuses 10 are, for example, server apparatuses or client terminals. The server apparatuses are servers that provide arbitrary functions and may include, for example, a domain management server, a Web server, a file server, a Windows® server, and a Samba server. The client terminals are arbitrary terminals and may include, for example, a desktop PC, a laptop PC, and a tablet terminal.

It is here assumed that the client terminals may use the functions provided by the server apparatuses and perform, for example, a cooperative processing, data sharing, and provision of various functions between the client terminals. In addition, it is assumed that a server apparatus may perform a cooperative processing with another server apparatus. That is, it is assumed that the information processing apparatuses 10 may arbitrarily perform a remote operation under predetermined conditions. In order to perform such a remote operation, for example, SMB (Server Message Block) or RPC (Remote Procedure Call) is used between the plural information processing apparatuses 10. The SMB and RPC are examples of application layer protocols for performing the remote operation.

The collecting apparatus 20 is, for example, a network switch or a tap having a packet duplication (mirroring) function. The collecting apparatus 20 collects packets related to the remote operation between the plural information processing apparatuses 10. Then, the collecting apparatus 20 transfers the collected packets to the network monitoring apparatus 30.

The network monitoring apparatus 30 is a computer that determines the success or failure of the remote operation performed by an information processing apparatus 10 infected with malware making a targeted attack such as RAT (Remote Administration Tool or Remote Access Tool) on another information processing apparatus 10.

The malware making a targeted attack such as RAT is sent to the information processing apparatuses 10 in the system environment E via, for example, a targeted mail or an illegal site. In a case where a specific information processing apparatus 10 is infected with the malware, the information processing apparatus 10 performs an illegal remote operation on the other information processing apparatuses 10, for example, according to an instruction received from a C&C (Command and Control) server 50 outside the system environment E. Hereinafter, the information processing apparatus 10 infected with malware making a targeted attack such as RAT will be referred to as an "infected apparatus 10," and the information processing apparatus 10 on which the illegal remote operation is performed by the infected apparatus 10 will be referred to as a "targeted apparatus 10." The detection of the information processing apparatus 10 infected with the malware may be performed using a technique of the related art.

As for the illegal remote operation by the infected apparatus 10, for example, there may be an operation of performing various scans on the targeted apparatus 10 to collect confidential information such as customer information, and then, transferring the collected confidential information to, for example, an attacker's PC. Further, for example, there may be an operation of sending a copy of the malware to the targeted apparatus 10 in order to spread the infection of malware. Further, there may be an operation of tampering or deleting information stored in the targeted apparatus 10.

Here, the remote operation is generally implemented by executing one or more commands. For example, an operation for sending malware to the targeted apparatus 10 is implemented by executing a command for opening an infection target file of the targeted apparatus 10, one or more commands for writing malware in the file in a predetermined byte unit, and a command for closing the file. Hereinafter, each of one or more commands for implementing the remote operation will be referred to as an "internal command."

Therefore, the remote operation is performed by transmitting a packet for requesting the execution of one or more internal commands (hereinafter, referred to as an "internal command request packet") from the infected apparatus 10 to the targeted apparatus 10.

The network monitoring apparatus 30 includes a network monitoring program 100 and a remote operation dictionary DB 200. The network monitoring program 100 refers to the remote operation dictionary DB 200 that stores information on a combination of characteristic internal commands in a case where the remote operation is successful, to determine the success or failure of the remote operation from an encrypted internal command request packet.

The combination of characteristic internal commands refers to a combination of internal commands to be at least executed when the remote operation is successful. For example, when the remote operation is a "file write" operation, the corresponding operation is performed by executing a command for opening a file, one or more commands for writing data in the file in a predetermined byte unit, and a command for closing the file. At this time, when the "file write" operation is successful, at least the command for opening a file and the one or more commands for writing data in the file in a predetermined byte unit are executed. Therefore, the combination of characteristic internal commands in a case where the "file write" operation is successful may be a combination of a command for opening a file and a command for writing data in the file in a predetermined byte unit.

The success or failure of the remote operation from the infected apparatus 10 to the targeted apparatus 10 is determined, so that for example, a security administrator of the system environment E may use the result of the determination as a reference when determining the contents or priorities of countermeasures against the illegal remote operation. For example, when the operation for sending malware from the infected apparatus 10 to the targeted apparatus 10 is successful, for example, a measure to isolate the infected apparatus 10 from the network may be taken in order to prevent the infection from being spread.

The configuration of the system illustrated in FIG. 1 is merely exemplary, and another configuration may be adopted. For example, the collecting apparatus 20 and the network monitoring apparatus 30 may be integrated with each other.

[Hardware Configuration]

Figure 2:
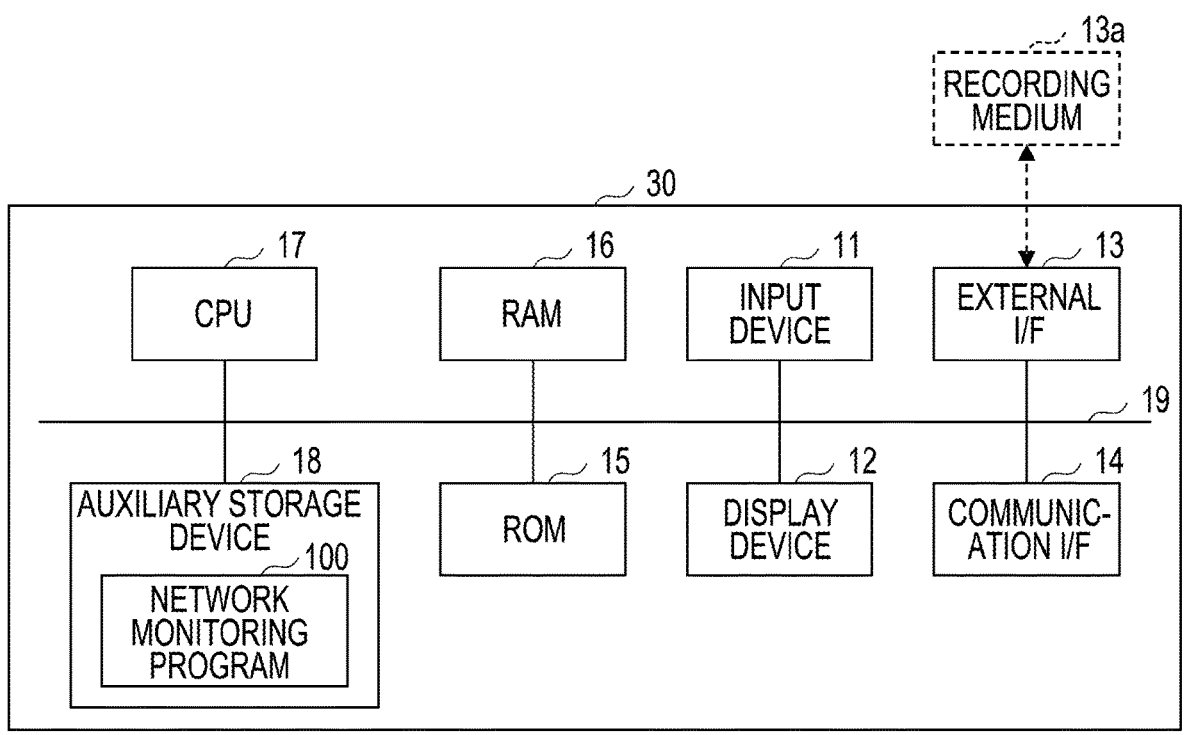
FIG. 2 is a view illustrating an example of a hardware configuration of the network monitoring apparatus according to the embodiment.

Next, a hardware configuration of the network monitoring apparatus 30 according to the present embodiment will be described with reference to FIG. 2. FIG. 2 is a view illustrating an example of the hardware configuration of the network monitoring apparatus 30 according to the present embodiment.

As illustrated in FIG. 2, the network monitoring apparatus 30 according to the present embodiment includes an input device 11, a display device 12, an external I/F 13, and a communication I/F 14. The network monitoring apparatus 30 according to the present embodiment further includes a ROM (Read Only Memory) 15, a RAM (Random Access Memory) 16, a CPU (Central Processing Unit) 17, and an auxiliary storage device 18. These hardware components are connected to each other by a bus 19.

The input device 11 is, for example, a keyboard, a mouse, or a touch panel and is used to input various operation signals to the network monitoring apparatus 30. The display device 12 is, for example, a display and displays results of various processes performed by the network monitoring apparatus 30. The network monitoring apparatus 30 may not have at least one of the input device 11 and the display device 12.

The external I/F 13 is an interface with an external device. The external device is, for example, a recording medium 13a. The network monitoring apparatus 30 is able to read and write in the recording medium 13a via the external I/F 13.

The recording medium 13a includes, for example, an SD memory card, a USB (Universal Serial Bus) memory, a CD (Compact Disk), and a DVD (Digital Versatile Disk).

The communication I/F 14 is an interface through which the network monitoring apparatus 30 is connected to a network. The network monitoring apparatus 30 is able to receive packets transferred from the collecting apparatus 20 via the communication I/F 14.

The ROM 15 is a nonvolatile semiconductor memory capable of holding data even when a power supply is turned off. The RAM 16 is a volatile semiconductor memory that temporarily holds programs or data. The CPU 17 is an arithmetic device that reads out programs or data from, for example, the auxiliary storage device 18 or the ROM 15 onto the RAM 16 and executes various processes.

The auxiliary storage device 18 is, for example, an HDD (Hard Disk Drive) or an SSD (Solid State Drive), and is a nonvolatile memory that stores programs or data. The auxiliary storage device 18 stores, for example, an OS (Operating System) which is basic software, various application programs, and the network monitoring program 100.

The network monitoring apparatus 30 according to the present embodiment has the hardware configuration illustrated in FIG. 2 so that various processes to be described later are implemented.

[Outline of Processes]

Figure 3:
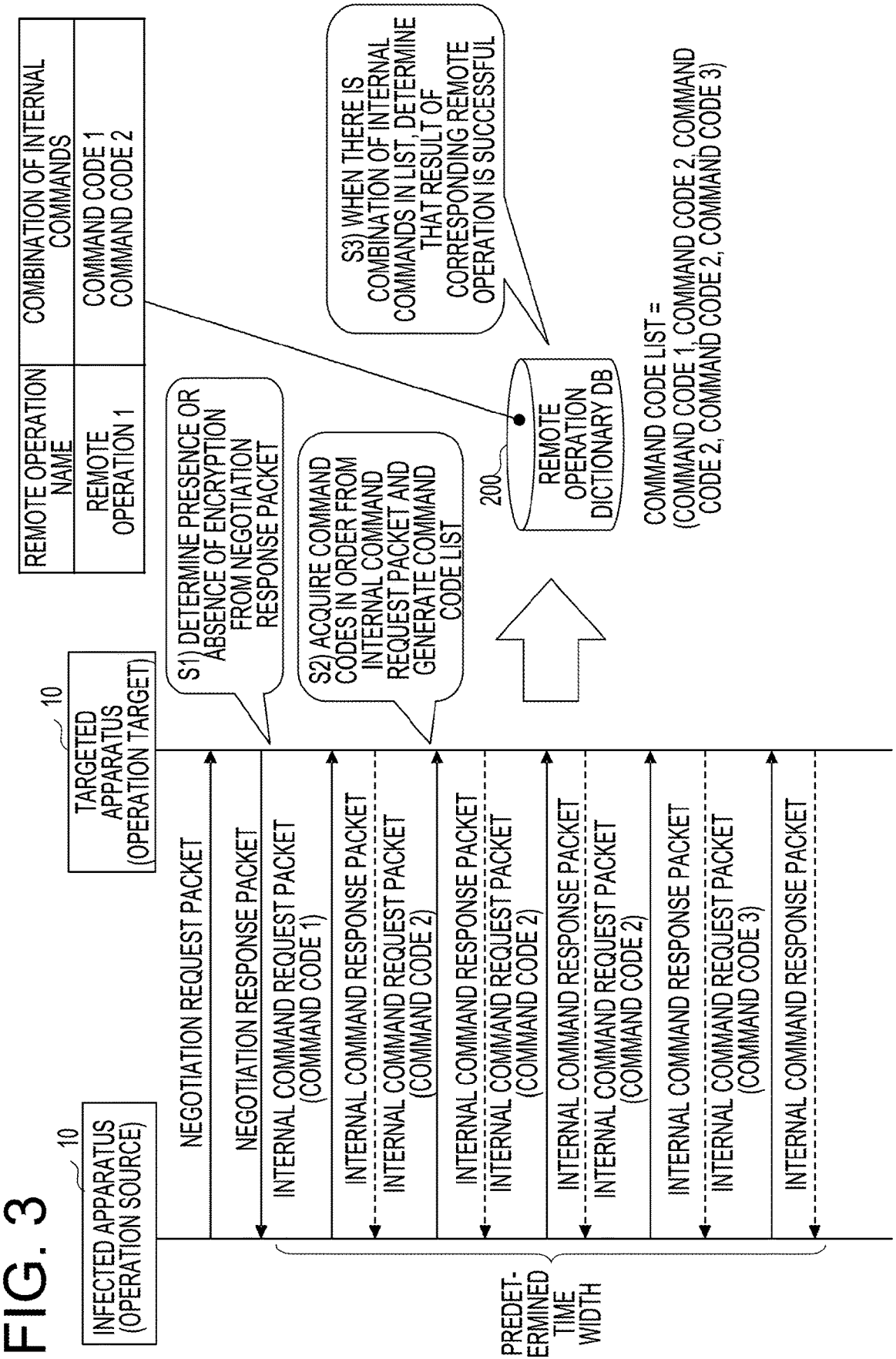
FIG. 3 is a view for explaining the outline of a process of determining a result of a remote operation.

Next, the outline of a process of determining the result of the remote operation from the infected apparatus 10 to the targeted apparatus 10 by the network monitoring apparatus 20 will be described with reference to FIG. 3. FIG. 3 is a view for explaining the outline of the process of determining the result of the remote operation. As illustrated in FIG. 3, various packets (e.g., a negotiation request packet, a negotiation response packet, an internal command request packet, and an internal command response packet) are transferred from the collecting apparatus 20 to the network monitoring apparatus 30.

S1) Prior to the remote operation, a negotiation is performed between the infected apparatus 10 and the targeted apparatus 10. That is, the infected apparatus 10 transmits a negotiation request packet to the targeted apparatus 10 which is an operation target. Meanwhile, upon receiving the negotiation request packet, the targeted apparatus 10 transmits a negotiation response packet to the infected apparatus 10 which is an operation source. The negotiation response packet includes, for example, a communication scheme used between the infected apparatus 10 and the target apparatus 10, and an encryption scheme in a case where the communication is encrypted.

Therefore, the network monitoring apparatus 30 determines the presence or absence of the encryption from the negotiation response packet. For example, when the negotiation response packet includes an encryption scheme, it is determined that the communication is encrypted. Meanwhile, when the negotiation response packet includes no encryption scheme, it is determined that the communication is not encrypted. The presence or absence of the encryption is determined according to, for example, a type of the OS or remote operation.

When it is determined that the communication is encrypted, the data portions of an internal command request packet and an internal command response packet to be transmitted and received after the negotiation are encrypted by a predetermined encryption scheme. It is hereinafter assumed that the communication is determined to be encrypted.

S2) One or more internal command request packets according to the remote operation and internal command response packets corresponding to the internal command requests are transmitted and received between the infected apparatus 10 and the targeted apparatus 10. Here, the header portion of an internal command request packet transmitted from the infected apparatus 10 to the targeted apparatus 10 is not encrypted.

Therefore, the network monitoring apparatus 30 sequentially acquires a command code included in the header portion of the internal command request packet in a predetermined time width, and generates a command code list. The command code is identification information for identifying a command and, for example, a command name or a command ID.

For example, it is assumed that an internal command request packet including "command code 1," three internal command request packets each including "command code 2," and an internal command request packet including "command code 3" are transmitted from the infected apparatus 10 to the targeted apparatus 10. In this case, a command code list of "command code 1, command code 2, command code 2, command code 2, command code 3" is generated.

The predetermined time width is, for example, a time width assumed to be required for one remote operation, and is preset by, for example, a security administrator.

S3) The network monitoring apparatus 30 determines whether or not there is a combination of internal commands included in the command code list generated in step S2, among combinations of internal commands stored in the remote operation dictionary DB 200. When it is determined that there is a combination of internal commands included in the command code list, the network monitoring apparatus 30 determines that the remote operation of the remote operation name associated with the corresponding combination has been successful.

For example, it is assumed that a remote operation name "remote operation 1" and a combination of internal commands "command code 1, command code 2" are stored in association with each other in the remote operation dictionary DB 200. In this case, "command code 1" and "command code 2" are included in this order in the command code list of "command code 1, command code 2, command code 2, command code 2, command code 3." Therefore, the network monitoring apparatus 30 determines that the remote operation of the remote operation name "remote operation 1" associated with the corresponding combination of internal commands is successful.

As described above, the network monitoring device 30 according to the present embodiment generates a command code list by acquiring a command code from the header portion of the internal command request packet for the remote operation. Then, when a combination of command codes of characteristic commands included in the remote operation is included in the command code list, the network monitoring apparatus 30 according to the present embodiment determines that the remote operation is successful. As a result, the network monitoring apparatus 30 according to the present embodiment may specify the success or failure of the remote operation even when the communication related to the remote operation between the infected apparatus 10 and the targeted apparatus 10 is encrypted.

When it is determined in step S1 that the communication is not encrypted, the data portions of the internal command request packet and the internal command response packet are not encrypted. Therefore, in this case, a technique of the related art may be used to determine the success or failure of the remote operation from, for example, a status value stored at a specific position of the first or last internal command response packet.

[Functional Configuration]

Figure 4:
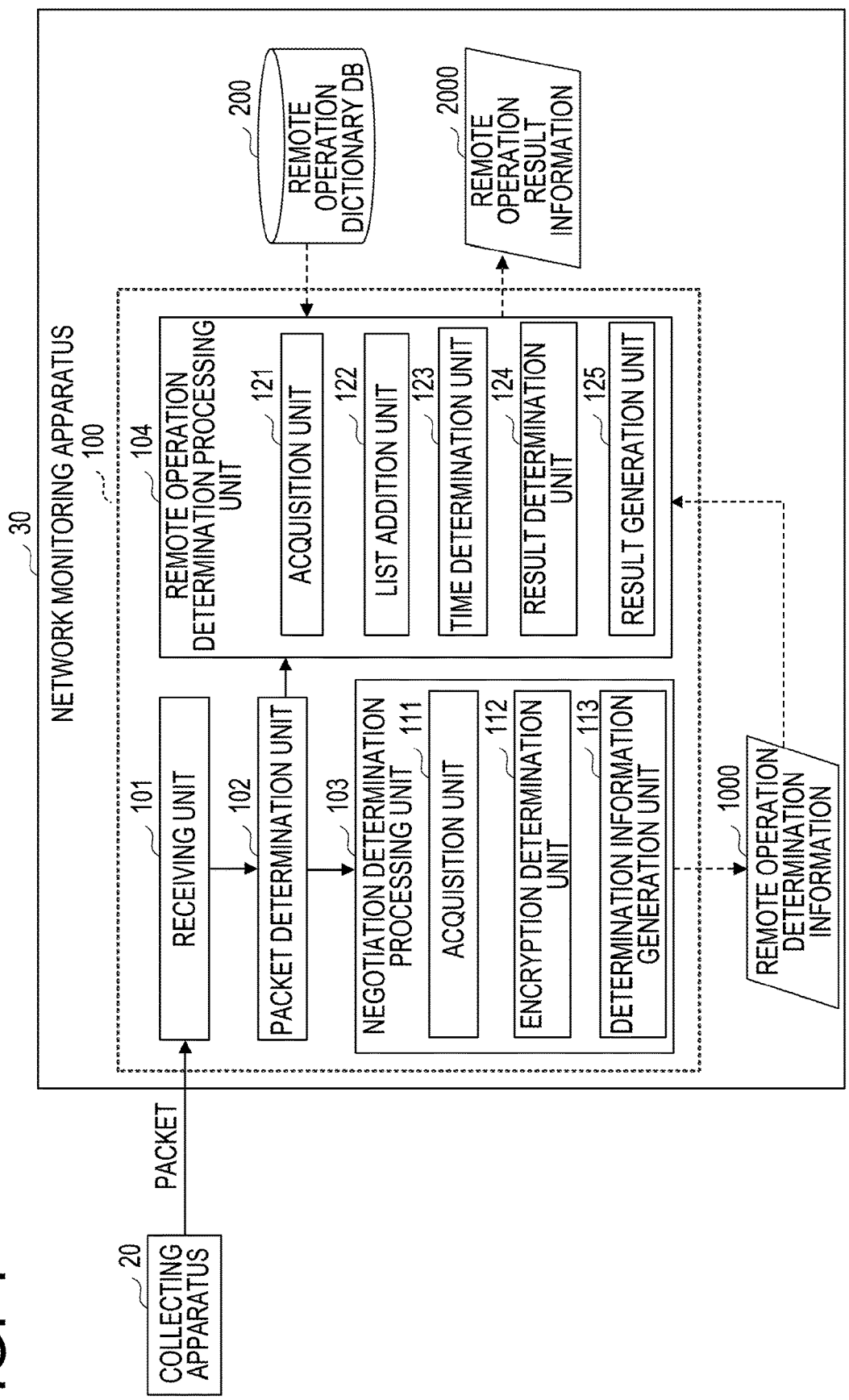
FIG. 4 is a view illustrating an example of a functional configuration of the network monitoring apparatus according to the embodiment.

Next, the functional configuration of the network monitoring apparatus 30 according to the present embodiment will be described with reference to FIG. 4. FIG. 4 is a view illustrating an example of the functional configuration of the network monitoring apparatus 30 according to the present embodiment.

As illustrated in FIG. 4, the network monitoring apparatus 30 according to the present embodiment includes a receiving unit 101, a packet determination unit 102, a negotiation determination processing unit 103, and a remote operation determination processing unit 104. These functional units are implemented by a process that the network monitoring program 100 causes the CPU 17 to execute.

Further, the network monitoring apparatus 30 according to the present embodiment includes the remote operation dictionary DB 200. The DB may be implemented by using, for example, the auxiliary storage device 18. The DB may be implemented by using, for example, a storage device connected to the network monitoring apparatus 30 via a network.

The receiving unit 101 receives various packets (e.g., a negotiation request packet, a negotiation response packet, an internal command request packet, and an internal command response packet) transferred from the collecting apparatus 20.

The packet determination unit 102 determines whether or not a packet received by the receiving unit 101 is the negotiation response packet. Further, the packet determination unit 102 determines whether or not a packet received by the receiving unit 101 is the internal command request packet.

When the packet determination unit 102 determines that the negotiation response packet has been received, the negotiation determination processing unit 103 performs, for example, the process of determining the presence or absence of the encryption of the communication related to the remote operation or generating an empty command code list. Here, the negotiation determination processing unit 103 includes an acquisition unit 111, an encryption determination unit 112, and a determination information generation unit 113.

The acquisition unit 111 acquires predetermined information (e.g., time, a transfer source IP (Internet Protocol) address, a transfer source port number, a reception destination IP address, a reception destination port number, and an encryption scheme) from the negotiation response packet received by the receiving unit 101.

As an example of a third determination unit, the encryption determination unit 112 determines the presence or absence of the encryption of the communication after the negotiation (that is, the internal command request packet and the internal command response packet).

When the encryption determination unit 112 determines that the communication after the negotiation is encrypted, the determination information generation unit 113 generates remote operation determination information 1000 including the empty command code list. The details of the remote operation determination information 1000 will be described later.

When the packet determination unit 102 determines that the internal command request packet has been received, the remote operation determination processing unit 104 performs the process of determining the success or failure of the remote operation. Here, the remote operation determination processing unit 104 includes an acquisition unit 121, a list addition unit 122, a time determination unit 123, a result determination unit 124, and a result generation unit 125.

The acquisition unit 121 acquires predetermined information (e.g., time, a transfer source IP address, a transfer source port number, a reception destination IP address, a reception destination port number, and a command code) from the header portion of the internal command request packet received by the receiving unit 101.

The list addition unit 122 adds the command code acquired by the acquisition unit 121 to the command code list of the remote operation determination information 1000.

The time determination unit 123 determines whether or not the internal command request packet received by the receiving unit 101 is within a predetermined time width from the negotiation.

When the time determination unit 123 determines that the received internal command request packet is within the predetermined time width, as an example of a first determination unit, the result determination unit 124 refers to the remote operation dictionary DB 200 to determine whether or not there is a combination of internal commands included in the command code list.

When the result determination unit 124 determines that there is a combination of internal commands included in the command code list, as an example of a second determination unit, the result generation unit 125 generates remote operation result information 2000 indicating that the remote operation associated with the corresponding combination of internal commands is successful. Meanwhile, when the time determination unit 123 determines that the received internal command request packet is not within the predetermined time width, the result generation unit 125 generates remote operation result information 2000 indicating that the remote operation is failed.

The remote operation result information 2000 generated by the result generation unit 125 is stored in a predetermined storage area of, for example, the auxiliary storage device 18.

Figures 5, 6:
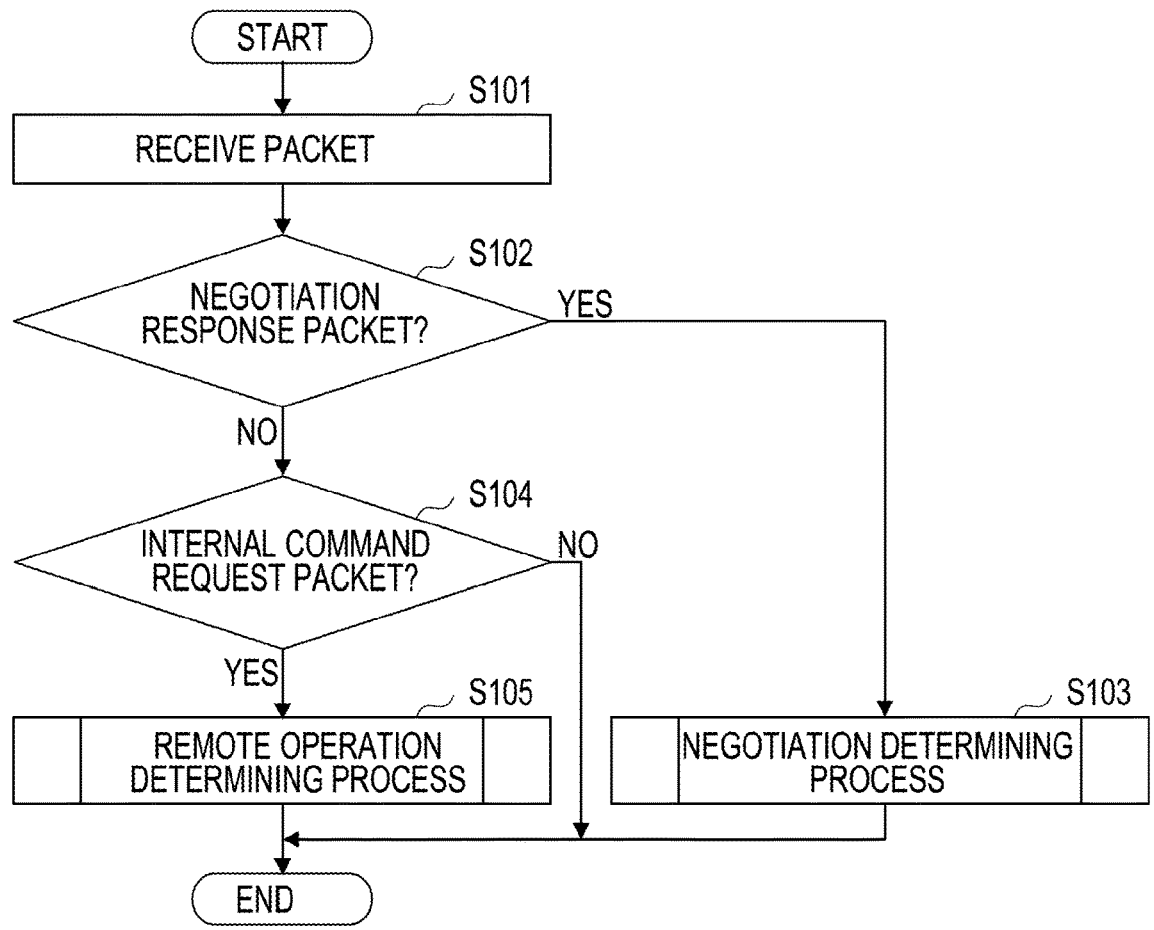
FIG. 5 is a view illustrating an example of a remote operation dictionary DB.
FIG. 6 is a flowchart illustrating an example of an overall process executed by the network monitoring apparatus according to the embodiment.

The remote operation dictionary DB 200 stores information on a combination of characteristic internal commands in a case where the remote operation is successful, for each remote operation. Here, the remote operation dictionary DB 200 will be described with reference to FIG. 5. FIG. 5 is a view illustrating an example of the remote operation dictionary DB 200.

As illustrated in FIG. 5, in the remote operation dictionary DB 200, a remote operation name and a combination of internal commands are associated with each other.

For example, a remote operation name "remote operation 1" is associated with a combination of internal commands "command code 1, command code 2." This indicates that at least an internal command of "command code 1" and an internal command of "command code 2" are executed in this order when the remote operation of the remote operation name "remote operation 1" is successful.

Similarly, for example, a remote operation name "remote operation 2" is associated with a combination of internal commands "command code 6, command code 8, command code 10." This indicates that at least an internal command of "command code 6," an internal command of "command code 8," and an internal command of "command code 10" are executed in this order when the remote operation of the remote operation name "remote operation 2" is successful.

In the example illustrated in FIG. 5, a remote operation name and a combination of internal commands are associated with each other. However, for example, identification information for identifying a remote operation, such as a remote operation ID, and a combination of internal commands may be associated with each other.

[Overall Process]

Next, the overall process executed by the network monitoring apparatus 30 according to the present embodiment will be described with reference to FIG. 6. FIG. 6 is a flowchart illustrating an example of the overall process executed by the network monitoring apparatus 30 according to the present embodiment. The overall process described below is executed each time a packet is transferred from the collecting apparatus 20.

First, the receiving unit 101 receives a packet transferred from the collecting apparatus 20 (operation S101).

Next, the packet determination unit 102 determines whether or not the packet received by the receiving unit 101 is the negotiation response packet (operation S102).

When it is determined in the operation S102 that the packet received by the receiving unit 101 is the negotiation response packet, the negotiation determination processing unit 103 performs a negotiation determining process (operation S103). In the negotiation determining process, for example, the determination of the presence or absence of the encryption of the communication related to the remote operation or the generation of the remote operation determination information 1000 is performed. The details of the negotiation determining process will be described later.

When it is determined in the operation S102 that the packet received by the receiving unit 101 is not the negotiation response packet, the packet determination unit 102 determines whether the packet is the internal command request packet (operation S104).

When it is determined in the operation S104 that the packet received by the receiving unit 101 is the internal command request packet, the remote operation determination processing unit 104 performs a remote operation determining process (operation S105). In the remote operation determining process, the success or failure of the remote operation is determined. The details of the remote operation determining process will be described later.

When it is determined in the operation S104 that the packet received by the receiving unit 101 is not the internal command request packet, the network monitoring apparatus 30 ends the process.

[Negotiation Determining Process]

Figure 7:
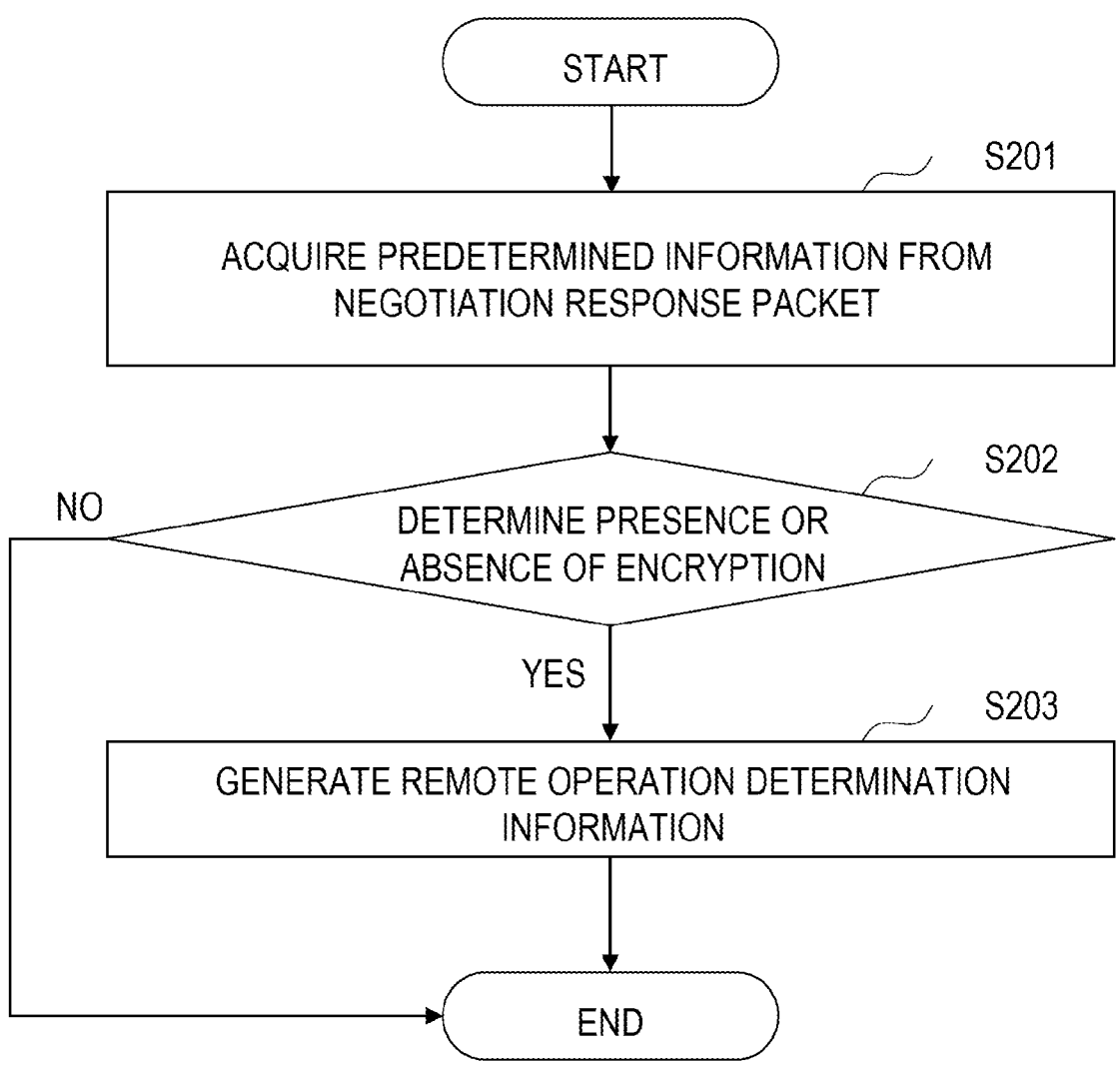
FIG. 7 is a flowchart illustrating an example of a negotiation determining process.

Next, the details of the negotiation determining process in the operation S103 of FIG. 6 will be described with reference to FIG. 7. FIG. 7 is a flowchart illustrating an example of the negotiation determining process.

First, the acquisition unit 111 of the negotiation determination processing unit 103 acquires predetermined information from the negotiation response packet received by the receiving unit 101 (operation S201). Examples of the predetermined information acquired by the acquisition unit 111 may include time, a transfer source IP address, a transfer source port number, a reception destination IP address, a reception destination port number, and an encryption scheme.

Next, the encryption determination unit 112 of the negotiation determination processing unit 103 determines the presence or absence of the encryption of the communication after the negotiation (operation S202). For example, when any encryption scheme is acquired from the negotiation response packet by the acquisition unit 111, the encryption determination unit 112 may determine that the communication after the negotiation is encrypted. Meanwhile, for example, when an encryption scheme is not acquired from the negotiation response packet by the acquisition unit 111 (or when, e.g., a NULL value is acquired as an encryption scheme), the encryption determination unit 112 may determine that the communication after the negotiation is not encrypted.

When it is determined in the operation S202 that the communication after the negotiation is encrypted, the determination information generation unit 113 of the negotiation determination processing unit 103 generates the remote operation determination information 1000 including an empty command code list (operation S203).

Figure 8:
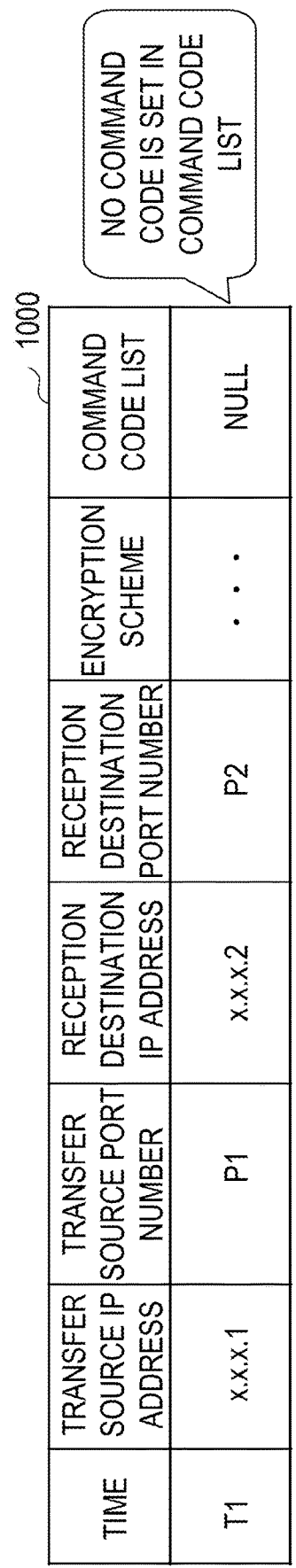
FIG. 8 is a view illustrating an example of remote operation determination information.

Here, the remote operation determination information 1000 generated by the determination information generation unit 113 will be described with reference to FIG. 8. FIG. 8 is a view illustrating an example of the remote operation determination information 1000.

As illustrated in FIG. 8, the remote operation determination information 1000 includes time, a transfer source IP address, a reception destination IP address, a reception destination port number, an encryption scheme, and a command code list.

The information acquired by the acquisition unit 111 in the above operation S201 is set in the time, the transfer source IP address, the reception destination IP address, the reception destination port number, and the encryption scheme of the remote operation determination information 1000 generated by the determination information generation unit 113. Further, for example, a NULL value is set in the command code list of the remote operation determination information 1000 generated by the determination information generation unit 113. That is, the remote operation determination information 1000 generated by the determination information creation unit 113 includes an empty command code list.

In this way, the determination information generation unit 113 generates the remote operation determination information 1000 including the empty command code list. The remote operation determination information 1000 generated by the determination information generation unit 113 is stored in a predetermined storage area of, for example, the RAM 16 or the auxiliary storage device 18.

When it is determined in the operation S202 that the communication after the negotiation is not encrypted, the negotiation determination processing unit 103 ends the process. In this case, since the data portion of the internal command response packet is not encrypted, a technique of related art may be used to determine the success or failure of the remote operation from a status value stored at a specific position of the first or last internal command response packet.

[Remote Operation Determining Process]

Figure 9:
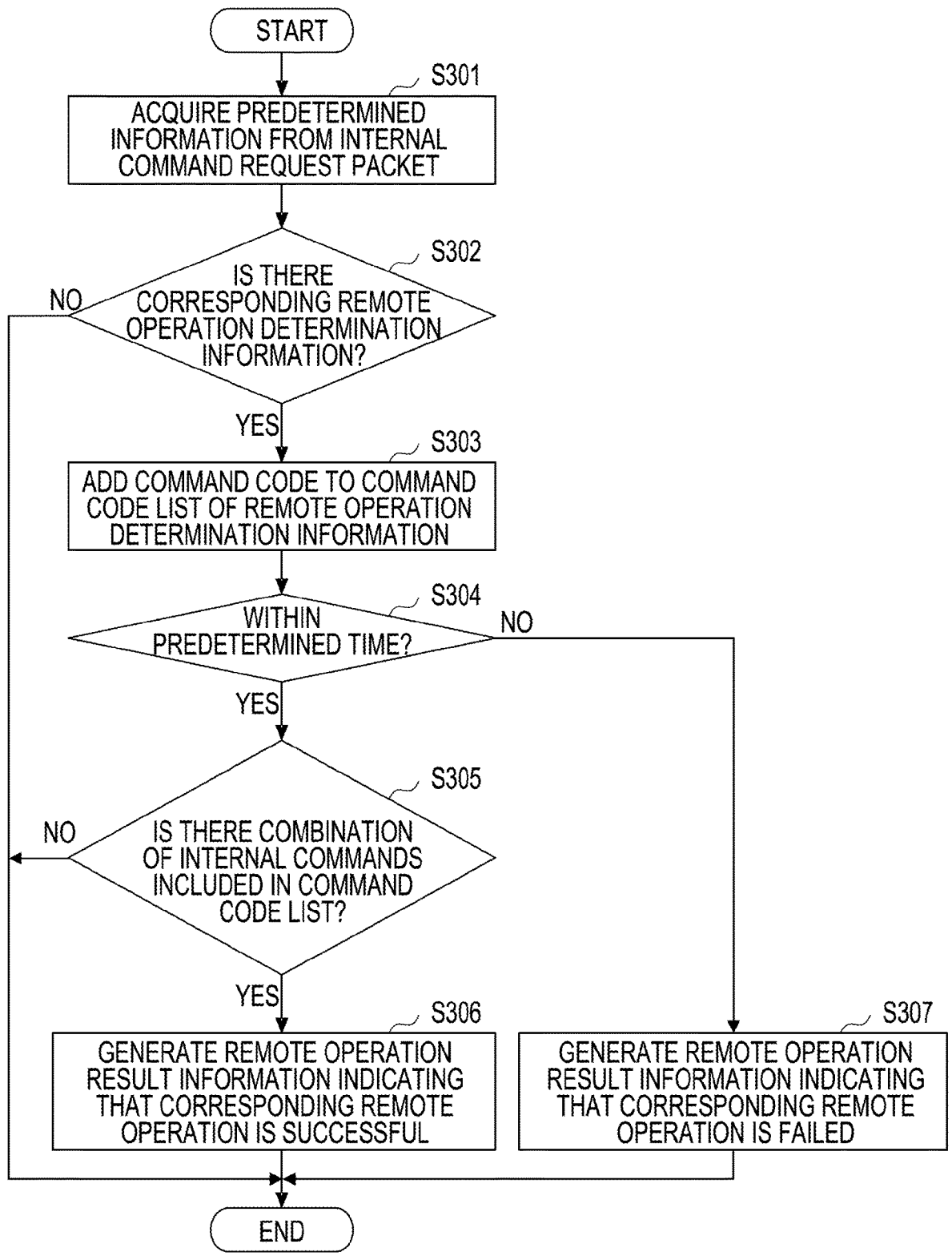
FIG. 9 is a flowchart illustrating an example of a remote operation determining process.

Next, the details of the remote operation determining process in the operation S105 of FIG. 6 will be described with reference to FIG. 9. FIG. 9 is a flowchart illustrating an example of the remote operation determining process.

First, the acquisition unit 121 of the remote operation determination processing unit 104 acquires predetermined information from the header portion of the internal command request packet received by the receiving unit 101 (operation S301). Examples of the predetermined information acquired by the acquisition unit 121 may include time, a transfer source IP address, a transfer source port number, a reception destination IP address, a reception destination port number, and a command code.

Next, the list addition unit 122 of the remote operation determination processing unit 104 determines whether or not there is the corresponding remote operation determination information 1000 (operation S302). That is, the list addition unit 122 determines whether or not there is the remote operation determination information 1000 including the transfer source IP address, the transfer source port number, the reception destination IP address, and the reception destination port number acquired by the acquisition unit 121.

When it is determined in the operation S302 that there is the corresponding remote operation determination information 1000, the list addition unit 122 adds the command code acquired by the acquisition unit 121 to the command code list of the remote operation determination information 1000 (operation S303).

Here, FIG. 10 illustrates the remote operation determination information 1000 in which the command code is added to the command code list. In the example illustrated in FIG. 10, for example, "command code 1," "command code 2," and "command code 2" are added to the command code list of the remote operation determination information 1000. In this way, the list addition unit 122 sequentially adds the command codes acquired by the acquisition unit 121 to the command code list of the corresponding remote operation determination information 1000.

Next, the time determination unit 123 of the remote operation determination processing unit 104 determines whether or not the internal command request packet received by the receiving unit 101 is within a predetermined time width from the negotiation (operation S304). That is, the time determination unit 123 determines whether or not the time acquired by the acquisition unit 121 is within a predetermined time width from the time included in the corresponding remote operation determination information 1000.

When it is determined in the operation S304 that the time acquired by the acquisition unit 121 is within the predetermined time width, the result determination unit 124 of the remote operation determination processing unit 104 determines whether or not the combination of internal commands included in the command code list exists in the remote operation dictionary DB 200 (operation S305). That is, the result determination unit 124 determines whether or not the combination of internal commands included in the command code list of the corresponding remote operation determination information 1000 exists, while maintaining the order of the internal commands, among the combinations of internal commands stored in the remote operation dictionary DB 200.

For example, it is assumed that the command code list of the corresponding remote operation determination information 1000 includes "command code 1," "command code 2," and "command code 2." In this case, the combination of internal commands "command code 1, command code 2" stored in the remote operation dictionary DB 200 illustrated in FIG. 5 is included in this order in the command code list. Therefore, in this case, the result determination unit 124 determines that the combination of internal commands included in the command code list exists in the remote operation dictionary DB 200.

Further, for example, it is assumed that the command code list of the corresponding remote operation determination information 1000 includes "command code 6," "command code 7," "command code 8," "command code 9," and "command code 10." In this case, the combination of internal commands "command code 6, command code 8, command code 10" stored in the remote operation dictionary DB 200 illustrated in FIG. 5 is included in this order in the command code list. Therefore, in this case, the result determination unit 124 determines that the combination of internal commands included in the command code list exists in the remote operation dictionary DB 200.

When it is determined in the operation S305 that the combination of internal commands included in the command code list exists, the result generation unit 125 of the remote operation determination processing unit 104 generates the remote operation result information 2000 indicating that the remote operation associated with the corresponding combination of internal commands is successful (operation S306).

For example, it is assumed that the combination of internal commands "command code 1, command code 2" is determined to be included in the command code list. In this case, the result generation unit 125 generates the remote operation result information 2000 indicating that the remote operation of the remote operation name "remote operation 1" associated with the corresponding combination of internal commands is successful.

Further, for example, it is assumed that the combination of internal commands "command code 6, command code 8, command code 10" is determined to be included in the command code list. In this case, the result generation unit 125 generates the remote operation result information 2000 indicating that the remote operation of the remote operation name "remote operation 2" associated with the corresponding combination of internal commands is successful.

Here, FIG. 11A illustrates the remote operation result information 2000 indicating that the remote operation is successful. As illustrated in FIG. 11A, the remote operation result information 2000 indicating that the remote operation is successful includes time, a transfer source IP address, a reception destination IP address, a reception destination port number, a remote operation name, and a remote operation result.

The same information as the remote operation determination information 1000 is set in the time, the transfer source IP address, the reception destination IP address, and the reception destination port number of the remote operation result information 2000 indicating that the remote operation is successful. The remote operation name associated with the combination of internal commends that has been determined to be included in the command code list is set in the remote operation name of the remote operation result information 2000 indicating that the remote operation is successful. The corresponding remote operation name is acquired from the remote operation dictionary DB 200. "Success" is set in the remote operation result of the remote operation result information 2000 indicating that the remote operation is successful.

In this way, the result generation unit 125 generates the remote operation result information 2000 including a remote operation name and a result indicating that the remote operation is successful. The remote operation result information 2000 generated by the result generation unit 125 is stored in a predetermined storage area of, for example, the auxiliary storage device 18.

Meanwhile, when it is determined in the operation S304 that the time acquired by the acquisition unit 121 is not within the predetermined time width, the result generation unit 125 of the remote operation determination processing unit 104 generates the remote operation result information 2000 indicating that the remote operation is failed (operation S307).

Here, FIG. 11B illustrates the remote operation result information 2000 indicating that the remote operation is failed. As illustrated in FIG. 11B, the remote operation result information 2000 indicating that the remote operation is failed includes time, a transfer source IP address, a reception destination IP address, a reception destination port number, a remote operation name, a remote operation result, and a command code list. When the remote operation name cannot be specified, the remote operation result information 2000 indicating that the remote operation is failed does not include the remote operation name. Meanwhile, when the remote operation name can be specified, the remote operation name is included.

The same information as the remote operation determination information 1000 is set in the time, the transfer source IP address, the reception destination IP address, and the reception destination port number of the remote operation result information 2000 indicating that the remote operation is failed. "Failure" is set in the remote operation result of the remote operation result information 2000 indicating that the remote operation is failed.

Further, the same information as the remote operation determination information 1000 is set in the command code list of the remote operation result information 2000 indicating that the remote operation is failed. When the command code list is included in the remote operation result information 2000 indicating that the remote operation is failed, for example, a security administrator of the system environment E may grasp the commands that have been executed for the failed remote operation.

In this way, the result generation unit 125 generates the remote operation result information 2000 including a result indicating that the remote operation is failed and a list of commands executed by the corresponding remote operation. The remote operation result information 2000 generated by the result generation unit 125 is stored in a predetermined storage area of, for example, the auxiliary storage device 18.

When it is determined in the operation S302 that there is no corresponding remote operation determination information 1000, the remote operation determination processing unit 104 ends the process. Similarly, when it is determined in the operation S305 that the combination of internal commands included in the command code list does not exist in the remote operation dictionary DB 200, the remote operation determination processing unit 104 ends the process.

As described above, the network monitoring apparatus 30 according to the present embodiment determines the presence or absence of the encryption of the communication after the negotiation between the infected apparatus 10 and the targeted apparatus 10. Further, when the communication is encrypted, the network monitoring apparatus 30 according to the present embodiment sequentially acquires a command code from the header portion of the request packet of the command executed by the remote operation. Then, when the combination of the acquired command codes is stored in the remote operation dictionary DB 200, the network monitoring apparatus 30 according to the present embodiment determines that the remote operation associated with the corresponding combination is successful.

Thus, even when the communication is encrypted, the network monitoring apparatus 30 according to the present embodiment may specify the success or failure of the remote operation performed by the infected apparatus 10 on the targeted apparatus 10.

By grasping the success or failure of the remote operation, for example, a security administrator of the system environment E may refer to the result of the success or failure of the remote operation when determining the contents or priorities of countermeasures against the illegal remote operation from the infected apparatus 10 to the targeted apparatus 10.

The remote operation result information 2000 illustrated in FIGS. 11A and 11B may include information such as an account name used for the remote operation to the targeted apparatus 10, a service name used by the infected apparatus 10 for the remote operation, and a file name of an operation target. Thus, for example, a security administrator of the system environment E may refer to the information such as the account name, the service name, and the file name to determine the contents or priorities of countermeasures against the illegal remote operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A network monitoring apparatus comprising:
   a memory in which information of a remote operation and a combination of command codes are associated with each other within a command code list; and
   a processor coupled to the memory and the processor configured to:
   acquire commands codes from a header of an encrypted execution request packet for executing commands for implementing a remote operation;
   determine whether or not the combination is included in the command code list in which the acquired command codes are sequentially indicated, by referring the memory; and
   determine that the remote operation associated with the combination is successful when it is determined that there exists the combination included in the command code list, wherein
   the processor determines the remote operation is not malware when the acquired command codes in sequence are included within the command code list.

2. The network monitoring apparatus according to claim 1,
   wherein the processor is configured to
   acquire the command codes from the header of the execution request packet transmitted and received within a predetermined time after a negotiation is performed between an operation source apparatus and an operation target apparatus of the remote operation, and
   determine that the remote operation is failed when it is determined that there does not exist the combination included in the command code list within the predetermined time.

3. The network monitoring apparatus according to claim 2,
wherein the processor is further configured to:
determine, from a response packet indicating a response of the negotiation, whether or not the execution request packet is encrypted, and
wherein the processor is configured to acquire, when it is determined that the execution request packet is encrypted, the command codes from the header of the encrypted execution request packet.

4. A network monitoring method comprising:
acquiring commands codes from a header of an encrypted execution request packet for executing commands for implementing a remote operation;
determining whether or not there exists a combination included in a command code list in which the acquired command codes are sequentially indicated, by referring to a memory in which information of the remote operation and the combination of command codes are associated with each other;
determining that the remote operation associated with the combination is successful when it is determined that there exists the combination included in the command code list, by a processor; and
determining the remote operation is not malware when the acquired command codes in sequence are included within the command code list.

5. The network monitoring method according to claim 4, wherein
the acquiring acquires the command codes from the header of the execution request packet transmitted and received within a predetermined time after a negotiation is performed between an operation source apparatus and an operation target apparatus of the remote operation, and
the determining determines that the remote operation is failed when it is determined that there does not exist the combination included in the command code list within the predetermined time.

6. The network monitoring method according to claim 5, further comprising:
determining, from a response packet indicating a response of the negotiation, whether or not the execution request packet is encrypted, by the processor, and
wherein the acquiring acquires, when it is determined that the execution request packet is encrypted, the command codes from the header of the encrypted execution request packet.

7. A computer-readable non-transitory recording medium storing a program that causes a computer to execute a procedure, the procedure comprising:
acquiring commands codes from a header of an encrypted execution request packet for executing commands for implementing a remote operation;
determining whether or not there exists a combination included in a command code list in which the acquired command codes are sequentially indicated, by referring to a memory in which information of the remote operation and the combination of the command codes are associated with each other;
determining that the remote operation associated with the combination is successful when it is determined that there exists the combination included in the command code list; and
determining the remote operation is not malware when the acquired command codes in sequence are included within the command code list.

8. The computer-readable non-transitory recording medium according to claim 7,
wherein
the acquiring acquires the command codes from the header of the execution request packet transmitted and received within a predetermined time after a negotiation is performed between an operation source apparatus and an operation target apparatus of the remote operation, and
the determining determines that the remote operation is failed when it is determined that there does not exist the combination included in the command code list within the predetermined time.

9. The computer-readable non-transitory recording medium according to claim 8, the procedure further comprising:
determining, from a response packet indicating a response of the negotiation, whether or not the execution request packet is encrypted, by the processor, and
wherein the acquiring acquires, when it is determined that the execution request packet is encrypted, the command codes from the header of the encrypted execution request packet.

* * * * *